United States Patent
Wieres

Patent Number: 6,036,926
Date of Patent: Mar. 14, 2000

[54] HONEYCOMB BODY OF SHEET METAL LAYERS WITH REINFORCING STRUCTURES AND CATALYTIC REACTOR HAVING THE HONEYCOMB BODY

[75] Inventor: Ludwig Wieres, Overath, Germany

[73] Assignee: Emitec Gesellschaft fuer Emissionstechnologie mbH, Lohmar, Germany

[21] Appl. No.: 09/063,315

[22] Filed: Apr. 20, 1998

Related U.S. Application Data

[63] Continuation of application No. PCT/EP96/04215, Sep. 26, 1996.

[30] Foreign Application Priority Data

Oct. 20, 1995 [DE] Germany .......................... 195 39 168

[51] Int. Cl.⁷ .................................................. B01D 53/34
[52] U.S. Cl. ......................... 422/180; 422/177; 422/222; 502/439; 502/527.18
[58] Field of Search .......................... 422/171, 173–174, 422/180, 199, 222; 60/299–300; 428/116, 593–594; 502/439, 527.18, 527.19

[56] References Cited

U.S. PATENT DOCUMENTS

| | | | |
|---|---|---|---|
| 5,102,743 | 4/1992 | Maus et al. | 428/593 |
| 5,157,010 | 10/1992 | Maus et al. | 502/439 |
| 5,240,682 | 8/1993 | Cornelison et al. | 422/174 |
| 5,441,706 | 8/1995 | Whittenberger | 422/174 |
| 5,795,658 | 8/1998 | Bode et al. | 428/593 |

*Primary Examiner*—Hien Tran
*Attorney, Agent, or Firm*—Herbert L. Lerner; Laurence A. Greenberg; Werner H. Steiner

[57] ABSTRACT

A honeycomb body, in particular for a catalytic reactor for exhaust gases of an internal combustion engine of a motor vehicle, has passages through which a fluid can pass from one end to the other and structured, or smooth and structured, sheet metal layers. At least a part of the sheet metal layers has a thickness of less than $40\mu$, preferably about $30\mu$, and at least a part of the sheet metal layers with a thickness of less than $40\mu$ has portions with additional reinforcing structures. The additional reinforcing structures are preferably bent-over portions in the region of one or both ends of the honeycomb body, in particular to a depth of from 1 to 10 mm, preferably about 3 to 5 mm, from the ends. The sheet metal layers can be joined together by brazing at least at a part of their contact locations, more particularly preferably in the regions of the additional reinforcing structures. The ends of the sheet metal layers may also be provided with reinforcing structures for better bonding to a tubular casing. The reinforcing structures at the ends may also be used in relation to thicker sheet metal layers for additional mechanical stiffening of a heavily loaded honeycomb body.

21 Claims, 2 Drawing Sheets

HONEYCOMB BODY OF SHEET METAL LAYERS WITH REINFORCING STRUCTURES AND CATALYTIC REACTOR HAVING THE HONEYCOMB BODY

CROSS-REFERENCE TO RELATED APPLICATION

This application is a continuation of International Application No. PCT/EP96/04215, filed Sep. 26, 1996, which designated the United States.

BACKGROUND OF THE INVENTION

Field of the Invention

The invention relates to a honeycomb body with passages through which a fluid can pass from one end to the other, in particular for a catalytic reactor for exhaust gases of an internal combustion engine of a motor vehicle, including structured, or smooth and structured, and in particular corrugated, sheet metal layers.

Honeycomb bodies of sheet metal layers of the specified kind are known, for example, from International Patent Application WO89/07 488. In that configuration smooth and corrugated sheet metal layers are disposed one upon the other alternately in a stack and twisted. Some of the sheet metal layers are thicker than others. The thicker sheet metal layers serve to increase the stability of the stack, in particular when it is fitted into a tubular casing. However, the provision of individual sheet metal layers of different thicknesses in the stack involves an increased level of manufacturing expenditure.

In certain uses of a honeycomb body, there is no need to provide individual thicker sheet metal layers for the purposes of increasing stability. In addition it is basically advantageous to make the sheet metal layers as thin as possible in order to reduce the weight and the costs of the honeycomb body. That aim, however, is in conflict with the aim of affording a high level of stability for the honeycomb body and long-term resistance to corrosion. Although most regions of a honeycomb body are only subjected to loadings which can be withstood even by very thin foils, there are nonetheless two difficulties in terms of using foils of a thickness of below $40\mu$, in particular, for example, about $30\mu$. On one hand the production and in that respect in particular mechanical joining of the foils to each other and/or to a tubular casing is difficult when dealing with thin foils. Holes are very easily produced particularly when brazing or welding such thin foils. On the other hand, during operation, the ends of such honeycomb bodies are subjected to particular mechanical loadings due to pulsating flows and particular corrosion and erosion phenomena.

There are also situations of use for metal honeycomb bodies, for example in exhaust gas cleaning installations in motorized bicycles, in which heretofore relatively thick foils of a thickness of between 80 and $120\mu$ were used, because of the high mechanical and/or corrosive loadings involved. In actual fact, as investigations have shown, in that situation the loading often occurs only in the end region.

SUMMARY OF THE INVENTION

It is accordingly an object of the invention to provide a honeycomb body of sheet metal layers with reinforcing structures and a catalytic reactor having the honeycomb body, which overcome the hereinafore-mentioned disadvantages of the heretofore-known devices of this general type, which have adequate stability for different situations of use, have the lowest possible weight, are resistant to corrosion and are mechanically robust.

With the foregoing and other objects in view there is provided, in accordance with the invention, a honeycomb body having two ends, in particular for a catalytic reactor for exhaust gases of an internal combustion engine of a motor vehicle, comprising structured, or smooth and structured, sheet metal layers defining passages for conducting a fluid from one of the ends to the other; at least a part of the sheet metal layers having a thickness of less than $40\mu$, in particular approximately $30\mu$; and at least a part of the sheet metal layers with a thickness of less than $40\mu$ having portions with additional reinforcing structures.

In accordance with another feature of the invention, the additional reinforcing structures are disposed in the vicinity of at least one of the ends, preferably at a depth of from 1 to 10 mm, in particular at a depth of approximately from 3 to 5 mm from, at least one of the ends.

In accordance with a further feature of the invention, the additional reinforcing structures are bent-over portions of edges of the sheet metal layers.

In accordance with an added feature of the invention, the sheet metal layers have contact locations and are joined together by brazing at least at a part of the contact locations, and more specifically preferably in the vicinity of the additional reinforcing structures.

In accordance with an additional feature of the invention, at least portions of at least a part of the sheet metal layers have microstructures, preferably at a height or a depth, relative to the surface of the sheet metal layers, of 10 to $50\mu$, forming the additional reinforcing structures, in particular mutually crossing microstructures.

In accordance with yet another feature of the invention, the sheet metal layers include smooth sheet metal layers having a first thickness and structured sheet metal layers having a second thickness, and all of the structured sheet metal layers are thinner than the smooth sheet metal layers by at least $5\mu$, preferably $10\mu$.

In accordance with yet a further feature of the invention, there is provided a tubular casing surrounding the honeycomb body, at least a part of the sheet metal layers having ends, the ends connected to the tubular casing, preferably by welding or brazing, and the ends having reinforcing structures.

In accordance with yet an added feature of the invention, the ends of the sheet metal layers connected to the tubular casing are bent over in a region of from 1 to 10 mm, preferably from about 3 to 5 mm.

A honeycomb body according to the invention is made up of structured or alternate substantially smooth and structured sheet metal layers. The structured sheet metal layers are preferably corrugated. The alternate configuration of substantially smooth and structured sheet metal layers or differently structured sheet metal layers forms passages through which a fluid can flow from one end to the other. The honeycomb body is particularly suitable for a catalytic reactor for exhaust gases of an internal combustion engine of a motor vehicle. For that purpose the walls of the passages of the honeycomb body carry a catalytic coating along which the exhaust gases of the internal combustion engine flow. According to the invention at least a part of the sheet metal layers has a thickness of less than $40\mu$, in particular about $30\mu$.

Usually all of the sheet metal layers of a honeycomb body have a given equal thickness of typically about 40 to $60\mu$.

According to the invention, in order to reduce the weight of the honeycomb body, the thickness of at least a part of the sheet metal layers is reduced to below 40μ, and preferably that applies to the thickness of all of the sheet metal layers. In order to nonetheless provide a sufficient level of mechanical stability, at least those sheet metal layers having a thickness which is below 40μ are provided with additional reinforcing structures.

Such reinforcing structures are particularly important in the region of the ends where the highest levels of mechanical loading occur and where preferably the mutual connections between the sheet metal layers are to be found. Such connections are produced by a procedure involving fusing or joining of the materials concerned. When effecting a brazing operation, for example, the base material may be alloyed by brazing material so that substantial changes in properties can occur when using very thin base material. If the material is reinforced in the regions to be brazed, that problem does not arise.

Reinforcement can be achieved at the ends in a particularly simple manner by bending or crimping over the edges of the sheet metal layers. The thickness of the sheet metal layers is doubled by virtue of that procedure in the bent-over region, without the weight of the honeycomb body being substantially increased or without its other properties being adversely affected. When the bent-over edges are bonded to the adjacent sheet metal layers, for example by brazing, under some circumstances that can even provide for a certain degree of additional elasticity of the honeycomb body in relation to alternating thermal loadings.

Bent-over configurations may also be advantageous at the ends of those sheet metal layers which are connected to a tubular casing by a procedure involving fusing or joining of the materials concerned. In this case reinforcement is also important in the production of durable connections.

It is also advantageous if the structured sheet metal layers have an additional structuring, transversely to the main structuring, as is described, for example, in European Patent 0 454 712 B1. That additional structuring has a substantially smaller amplitude than the main structuring and originally serves to influence a fluid which flows through the honeycomb body, in order to improve the contact of the fluid with the walls of the honeycombs. The thin sheet metal layers that are used according to the invention can be even more easily transversely structured and corrugated than sheet metal layers of a thickness of over 40μ. Surprisingly, such a microstructuring also enhances the mechanical properties of the thin sheet metal layers so that undesired deformation of the sheet metal layers during manufacture can be avoided. That applies in particular in relation to microstructures which extend in two mutually crossing directions that are inclined relative to the direction of flow through the honeycomb body.

With the objects of the invention in view, there is also provided a honeycomb body having ends, preferably for a catalytic reactor for exhaust gases of an internal combustion engine of a motor vehicle, in particular an electrically heatable catalytic reactor, comprising structured, or smooth and structured, sheet metal layers defining passages for conducting a fluid from one of the ends to the other; at least a part of the sheet metal layers having edges bent over at least at one of the ends, preferably with a width of from 1 to 10 mm, in particular from 3 to 5 mm.

This embodiment also solves the problems involved in situations of use with a high mechanical and/or corrosive loading in the end region. In general any foil can be reinforced irrespective of its initial thickness in the edge region by bending over the end edges so that in accordance with the invention it is possible to use thinner foils than heretofore even for extreme situations of use, but in return they are provided with reinforcing provisions in the edge region.

Other features which are considered as characteristic for the invention are set forth in the appended claims.

Although the invention is illustrated and described herein as embodied in a honeycomb body of sheet metal layers with reinforcing structures and catalytic reactor having the honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
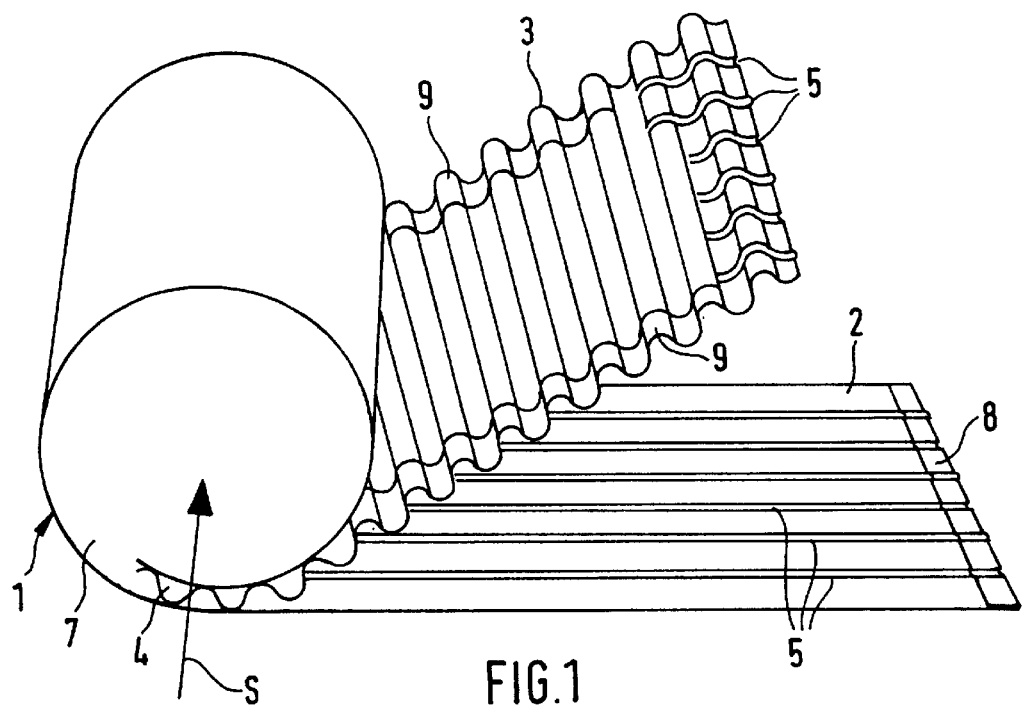
FIG. 1 is a diagrammatic, perspective view of a honeycomb body just before finishing thereof.

Referring now to the figures of the drawings in detail and first, particularly, to FIG. 1 thereof, there is seen a diagrammatic, perspective view of a honeycomb body 1 just before finishing thereof. The present embodiment concerns a honeycomb body which is wound in a spiral configuration from sheet metal layers, but the following description also applies to other types of honeycomb bodies, in particular those with sheet metal layers which are twisted or wound in an S-shape or honeycomb bodies that are layered and wound in some other manner. The honeycomb body 1 is made up of alternately disposed smooth sheet metal layers 2 and corrugated sheet metal layers 3. In the finished honeycomb body, the corrugation structure of the corrugated sheet metal layers 3 results in passages 4 through which an exhaust gas can flow in a flow direction S from one end 7 to the other. The corrugated sheet metal layers 3 and/or the smooth sheet metal layers 2 can be formed from foils having a thickness of below 40μ, in particular about 30μ. In order to stiffen such thin foils, it is advantageous to provide microstructures 5 which can have a height or a depth of, for example, 10–50μ. They are thus admittedly substantially smaller than the dimensions of the passages 4, but on an order of magnitude which provides significant mechanical reinforcement of the thin sheet metal layers 2, 3.

Figure 2:
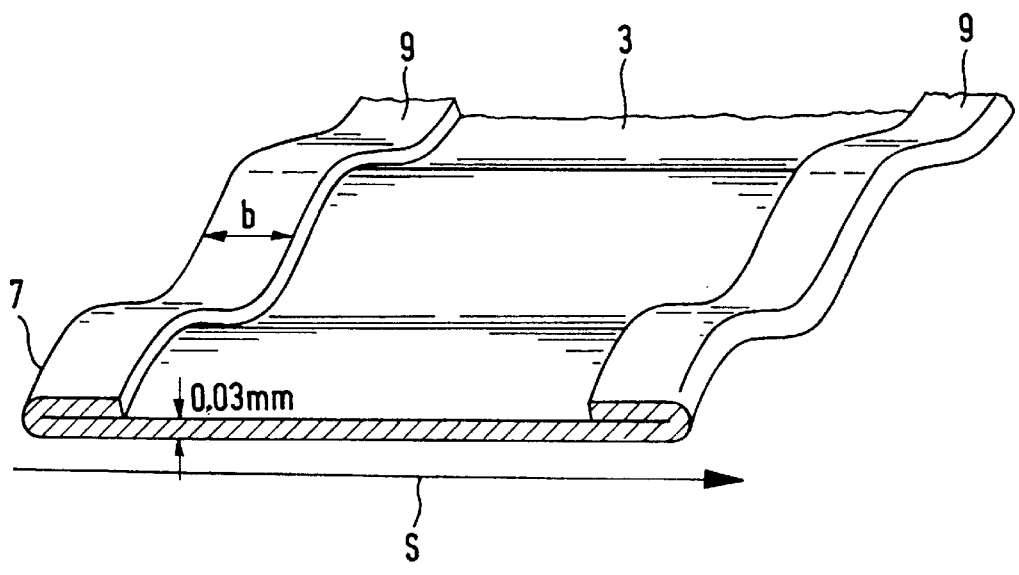
FIG. 2 is an enlarged, fragmentary, partly cross-sectional, perspective view of a portion of a corrugated sheet metal layer.

Alternatively and/or in addition to the microstructures 5, the edges of the sheet metal layers 2, 3 can be bent over with a width b shown in FIG. 2. A bent-over region 9 then has double the thickness so that the edge regions approximately correspond to conventional sheet metal layers, in terms of their performance and behavior. All in all, in regard to handleability of the sheet metal layers and the possibilities of connecting them together by a procedure involving fusing or joining of the metals concerned, it affords a situation which corresponds to that of conventional honeycomb bodies. Therefore, the bent-over sheet metal layer can be processed in other respects by using known manufacturing methods. The same advantages can be achieved by bending over end regions 8 of those sheet metal layers 2, 3 which are to be bonded to a non-illustrated tubular casing by a material-fusing or joining procedure. In this case too, the bending-over operation produces a situation which corresponds to that of conventional honeycomb bodies so that usual material-fusion or joining connections such as, for example, brazing or welding can also be used for bonding thin sheet metal layers to a tubular casing.

FIG. 2, which is not true to scale, illustrates the structural principle of a corrugated sheet metal layer 3 that is bent at its edges in accordance with the invention. The bent-over edge regions 9 produce a reinforcement effect over the width b so that the ends 7 are more solid or stable than those of conventional honeycomb bodies without reinforcing provisions, both mechanically as well as in regard to material-fusion or joining connections. Thus, for example, foils having a thickness of $30\mu$ enjoy almost the same mechanical qualities as a $60\mu$-thick foil. With foils having a $50\mu$ thickness, it is possible to achieve a stability that was achieved heretofore when using a thickness of about $100\mu$. At the same time, however, the weight of the entire honeycomb body remains relatively low so that in particular cold-starting characteristics are improved.

Figure 3:
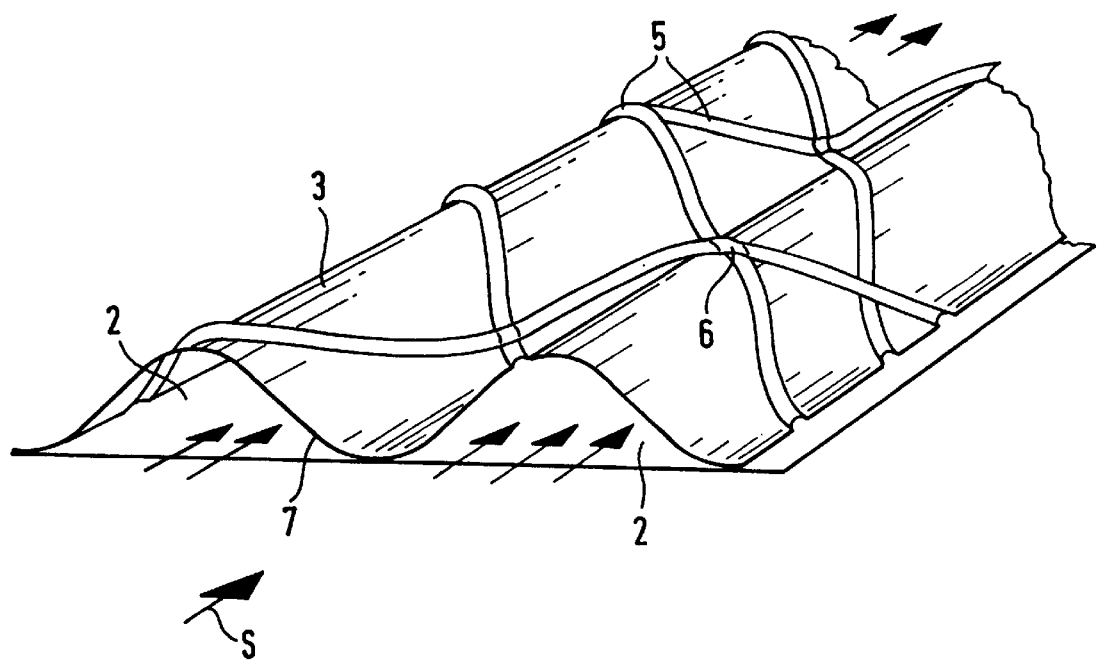
FIG. 3 is a fragmentary, perspective view of a portion of a honeycomb body showing crossed microstructures.

FIG. 3 shows a configuration of the microstructures 5 which are constructed in such a way that they cross over each other at intersections 6. The portion of the honeycomb body illustrated therein shows a corrugated sheet metal layer 3 with the microstructures 5 crossing each other at the intersections 6. However, such crossed microstructures enjoy considerable advantages not only in relation to corrugated sheet metal layers but naturally also in relation to smooth sheet metal layers 2 since they impart enhanced mechanical stiffness to those sheet metal layers without excessively restricting the flexibility thereof in the course of manufacture.

It should be pointed out that the present invention is suitable for use in relation to all known honeycomb bodies made up of sheet metal layers, irrespective of which structural shape is used and which joining procedure is employed for mechanical stabilization purposes. The invention is particularly advantageous for honeycomb bodies which are produced from a stack of sheet metal layers, that is twisted in an S-shape. The invention is also particularly suitable for honeycomb bodies which are made up of alternate, differently corrugated sheet metal layers.

Honeycomb bodies with a thickness which is reduced in accordance with the invention, for at least some of the sheet metal layers and with additional reinforcing structures, are suitable in particular for uses in which extreme corrosion stresses do not occur. Honeycomb bodies of the usual layer thickness and with reinforcing structures are now also suitable for uses in which thicker sheet metal layers were previously used because of higher levels of loading.

In the case of honeycomb bodies, in particular those which are installed in the region of a motor vehicle that is close to the engine, the axial distribution of the mass involved may be an important consideration for the performance in the cold-starting phase and in subsequent re-starts. For that purpose it is also specifically possible to use bent-over configurations in order to increase or not increase the mass in portions.

The bent-over configurations also make it possible in electrically heatable catalytic converters to specifically influence the electrical resistance, its axial distribution and the distribution of heat which occurs when the electrical heating is in operation. In that respect, bent-over sheet metal layers may be used in many known structural types of heatable catalytic converters, instead of the usual sheet metal layers, without involving substantial changes in the manufacturing process and the structure in principle. In the case of honeycomb bodies which are electrically subdivided by air gaps, the bent-over sheet metal layers that are preferably used as all of the sheet metal layers contribute to the stabilization effect and are insensitive to mechanical loadings at the ends. At the same time, the bent-over regions form particularly hot (axial) zones, because of the ohmic heat which is produced there (being doubled relative to the other regions), and that can be highly advantageous in terms of rapid response on the part of the catalytic converter.

I claim:

1. A honeycomb body, comprising:
   at least partly structured sheet metal layers having two ends and defining passages for conducting a fluid from one of said ends to an other of said ends, said at least partly structured sheet metal layers including at least one smooth sheet metal layer having a first thickness of less than $40\mu$ and at least one structured sheet metal layer having a second thickness thinner than said first thickness by at least $5\mu$, and at least a part of said at least partly structured sheet metal layers with a thickness of less than $40\mu$ having portions with a reinforcing structure formed as microstructures.

2. The honeycomb body according to claim 1, wherein said at least one structured sheet metal layer has said reinforcing structure.

3. The honeycomb body according to claim 1, wherein said first thickness is approximately $30\mu$.

4. The honeycomb body according to claim 1, wherein said reinforcing structure is disposed in the vicinity of at least one of said ends.

5. The honeycomb body according to claim 1, wherein said reinforcing structure is disposed at a depth of from 1 to 10 mm from at least one of said ends.

6. The honeycomb body according to claim 1, wherein said reinforcing structure is disposed at a depth of approximately from 3 to 5 mm from at least one of said ends.

7. The honeycomb body according to claim 1, wherein said sheet metal layers have sheet metal edges and include an additional reinforcing structure as bent-over portions of said sheet metal edges.

8. The honeycomb body according to claim 1, wherein said sheet metal layers have contact locations and are joined together by brazing at least a part of said contact locations.

9. The honeycomb body according to claim 7, wherein said sheet metal layers are joined together by brazing in the vicinity of said additional reinforcing structure.

10. The honeycomb body according to claim 1, wherein said reinforcing structure has a height or a depth of from 10 to $50\mu$.

11. The honeycomb body according to claim 1, wherein said reinforcing structure comprises mutually crossing microstructures.

12. The honeycomb body according to claim 1, wherein said at least one structured sheet metal layer is thinner than said at least one smooth sheet metal layer by $10\mu$.

13. A honeycomb assembly, comprising:
   a tubular casing; and
   a honeycomb body surrounded by said tubular casing and having two ends, said honeycomb body having at least partly structured sheet metal layers defining passages for conducting a fluid from one of said ends to an other of said ends, at least a part of said sheet metal layers having sheet metal ends, said sheet metal ends being connected to said tubular casing and having a reinforcing structure, said at least partly structured sheet metal layers including at least one smooth sheet metal layer having a first thickness of less than $40\mu$ and at least one structured sheet metal layer having a second thickness thinner than said first thickness by at least $5\mu$, and at least a part of said at least partly structured sheet metal layers with a thickness of less than $40\mu$ having portions with said reinforcing structure formed as microstructures.

14. The honeycomb assembly according to claim 13, wherein said sheet metal ends are connected to said tubular casing by welding or brazing.

15. The honeycomb assembly according to claim 13, wherein said sheet metal ends connected to said tubular casing are bent over in a region of from 1 to 10 mm.

16. The honeycomb assembly according to claim 13, wherein said sheet metal ends connected to said tubular casing are bent over in a region of from about 3 to 5 mm.

17. A catalytic reactor for exhaust gases of an internal combustion engine of a motor vehicle, comprising:

a honeycomb body carrying a catalytically active material and having two ends and at least partly structured sheet metal layers defining passages for conducting a fluid from one of said ends to an other of said ends, said at least partly structured sheet metal layers including at least one smooth sheet metal layer having a first thickness of less than $40\mu$ and at least one structured sheet metal layer having a second thickness thinner than said first thickness by at least $5\mu$, and at least a part of said at least partly, structured sheet metal layers with a thickness of less than $40\mu$ having portions with a reinforcing structure formed as microstructures.

18. A honeycomb body, comprising:

at least partly structured sheet metal layers having two ends and defining passages for conducting a fluid from one of said ends to an other of said ends, said at least partly structured sheet metal layers including at least one smooth sheet metal layer having a first thickness of less than $40\mu$ and at least one structured sheet metal layer having a second thickness thinner than said first thickness by at least $5\mu$ and portions with a reinforcing structure formed as microstructures, at least a part of said at least partly structured sheet metal layers having edges bent over at least at one of said ends and said reinforcing structure formed as microstructures.

19. The honeycomb body according to claim 18, wherein said edges are bent over in a width of from 1 to 10 mm.

20. The honeycomb body according to claim 18, wherein said edges are bent over in a width of from 3 to 5 mm.

21. A catalytic reactor for exhaust gases of an internal combustion engine of a motor vehicle, comprising:

a honeycomb body having ends and at least partly structured sheet metal layers defining passages for conducting a fluid from one of said ends to an other of said ends, at least a part of said sheet metal layers having edges bent over at least at one of said ends, said at least partly structured sheet metal layers including at least one smooth sheet metal layer having a first thickness of less than $40\mu$ and at least one structured sheet metal layer having a second thickness thinner than said first thickness by at least $5\mu$ and portions with a reinforcing structure formed as microstructures.

* * * * *